No. 775,072. PATENTED NOV. 15, 1904.
J. H. WHITELAW.
CARD GAME.
APPLICATION FILED FEB. 17, 1904.
NO MODEL.

Witnesses.
E. B. Gilchrist
B. W. Brockett

Inventor.
James Herbert Whitelaw
By Thurston & Bates
Attorneys

No. 775,072.                                              Patented November 15, 1904.

UNITED STATES PATENT OFFICE.

JAMES HERBERT WHITELAW, OF CLEVELAND, OHIO.

CARD GAME.

SPECIFICATION forming part of Letters Patent No. 775,072, dated November 15, 1904.

Application filed February 17, 1904. Serial No. 194,073. (No model.)

*To all whom it may concern:*

Be it known that I, JAMES HERBERT WHITELAW, a citizen of the United States, residing at Cleveland, in the county of Cuyahoga and State of Ohio, have invented a new, original, and entertaining Game to be Played with Cards, of which the following is a specification.

The object of my invention is to so design, arrange, and play a pack of cards that the players may imagine that they are making actual transactions in the stock-market, going long of the market, going short of the market, or straddling the market, as they choose, and in which their gain or loss is dependent upon the final closing of the market as indicated by a market-card hereinafter described. I attain this object by the method of play as set forth below and by the designs of the cards as shown in the accompanying drawings, in which—

Figure 1:
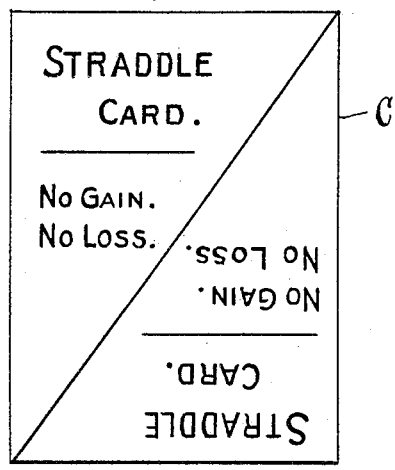
Figure 2:
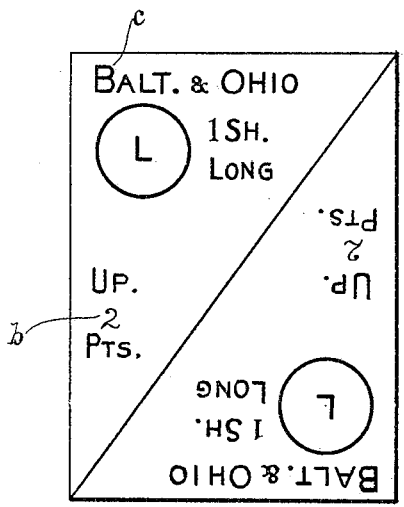
Figure 3:
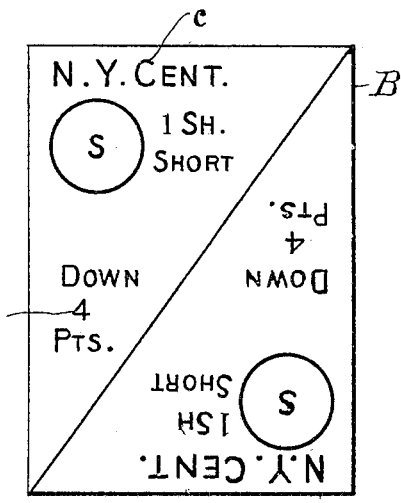

Figure 1 represents the straddle card. Fig. 2 represents the general design of what I shall hereinafter call the "long" cards. Fig. 3 represents the general design of what I shall hereinafter call the "short" cards.

The pack is made up of one so-called "straddle" card and two general groups of cards—to wit, one group of cards, called "short" cards, each of which bears on its face a symbol indicating that it is a short card and one group of cards, called "long" cards, each of which bears upon its face a symbol indicating that it is a long card. Each of these groups is subdivided into small groups or series, each series including, preferably, six cards, and all the cards of the several series bear on their faces the characteristic name of some marketable stock. By "marketable stock" is not meant necessarily an actual stock—such as is dealt in on the New York Stock Exchange, for example; but any name which may stand for marketable stock or a marketable commodity is intended to be included by the term "marketable stock" as used herein. Each series contains the same number of cards, preferably six, and there may be any number of series of cards, although the number of series should correspond with the number of players.

The name indicating the stock associated with each card is printed upon the face of the card—as, for example, as indicated by reference-letter *c* in Figs. 2 and 3. Some symbol—as, for example, the word "long" as it appears in Fig. 2—should be printed on the long cards A, or the word "short" as it appears in Fig. 3 should also printed upon the face of the short cards B to indicate which are short and which are long cards. Preferably also on each card should be figures indicating a certain number of points "up" or "down," as the case may be. These indications are designated by the reference-letter *b* on Figs. 2 and 3. The straddle card bears upon its face the words "Straddle card" or some other suggestive name and preferably also the words "No loss," "No gain."

The game may be played with the described cards in the following manner: The cards are shuffled and cut and dealt around one at a time until each player has six cards. The remaining card is laid face down in front of the dealer and is not to be looked at until after the trading is finished. (This card is the market-card and shows whether the market closes up or down.) At the rap of the dealer the trading of cards begins and continues until some player has accumulated the six long cards or six short cards of some one series, when he calls the market, and immediately the trading must cease and the dealer must turn the market-card face up. If the player calling the market should have accumulated a long-card series and the market-card should prove to be a long card marked "Up twenty pts.," the player gains six times twenty points—one hundred and twenty points; but if the market-card should prove to be a short card marked "Down twenty pts." the player loses six times twenty points—one hundred and twenty points—&c. Whether the market-card proves to be a long card or a short card, it is evident that the other five cards of that series are held by one or more of the players, and each card so held (of the same series as the market-card) gains one point for each point indicated on the market-card except when the straddle is held, and then the player neither gains nor loses, or, in other words, he is straddling the market.

I am aware that prior to my invention packs of cards have been in use wherein trading or exchange of cards is a feature and wherein commodities, such as stocks, have designated the cards, and I therefore do not claim those features as original; but What I do claim as my invention, and desire to secure by Letters Patent, is—

1. A pack of improved playing-cards for use in a game simulating stock-exchange transactions, the cards being divided into general groups, to wit, one group of "short" cards each of which bears on its face a symbol indicating that it is a "short" card, and a group of "long" cards each of which bears on its face a symbol indicating that it is a "long" card, and each of said groups being subdivided into smaller groups of which all the cards in each group bear characters indicating the name of a specific marketable stock, substantially as herein described.

2. A pack of improved playing-cards for use in a game simulating stock-exchange transactions consisting of a "straddle" card, and a series of cards which are divided into two general groups, to wit, one group of "short" cards each of which bears on its face a symbol which indicates that it is a "short" card, and a group of "long" cards each of which bears on its face a symbol indicating that it is a "long" card, substantially as herein described.

In testimony whereof I have signed my name to this specification, in the presence of two subscribing witnesses, February 15, 1904.

JAMES HERBERT WHITELAW.

Witnesses:
 WM. D. YOUNG,
 E. H. GEHLBACH.